(12) United States Patent
Thibaut

(10) Patent No.: US 12,392,454 B2
(45) Date of Patent: Aug. 19, 2025

(54) METHOD FOR PERFORMING PRESSURE TESTS ON A COMPOSITE PRESSURE VESSEL AND DEVICE FOR MANUFACTURING AND PRESSURE TESTING THE COMPOSITE PRESSURE VESSEL

(71) Applicant: PLASTIC OMNIUM NEW ENERGIES FRANCE, Lyons (FR)

(72) Inventor: Denis Thibaut, Brussels (BE)

(73) Assignee: PLASTIC OMNIUM NEW ENERGIES FRANCE, Lyons (FR)

( * ) Notice: Subject to any disclaimer, the term of this patent is extended or adjusted under 35 U.S.C. 154(b) by 450 days.

(21) Appl. No.: 17/996,526

(22) PCT Filed: Apr. 22, 2021

(86) PCT No.: PCT/EP2021/060581
§ 371 (c)(1),
(2) Date: Oct. 19, 2022

(87) PCT Pub. No.: WO2021/214250
PCT Pub. Date: Oct. 28, 2021

(65) Prior Publication Data
US 2023/0078383 A1  Mar. 16, 2023

(30) Foreign Application Priority Data
Apr. 22, 2020  (EP) .................................... 20170802

(51) Int. Cl.
*F17C 13/02* (2006.01)
*F17C 13/12* (2006.01)

(52) U.S. Cl.
CPC ............. *F17C 13/02* (2013.01); *F17C 13/12* (2013.01); *F17C 2201/0109* (2013.01);
(Continued)

(58) Field of Classification Search
CPC .. F17C 13/02; F17C 13/12; F17C 2201/0109; F17C 2201/056; F17C 2203/0619;
(Continued)

(56) References Cited

U.S. PATENT DOCUMENTS 4,419,884 A     12/1983  Grenci et al.
5,383,566 A *   1/1995   Johnson .................. B60T 17/06
                                                        220/586
(Continued)

FOREIGN PATENT DOCUMENTS

DE    32 18 653 A1    11/1983
JP    61-181937       8/1986
(Continued)

OTHER PUBLICATIONS

International Search Report issued Aug. 8, 2021 in PCT/EP2021/060581 filed on Apr. 22, 2021, 4 pages.
(Continued)

*Primary Examiner* — Andre J Allen
(74) *Attorney, Agent, or Firm* — Oblon, McClelland, Maier & Neustadt, L.L.P.

(57) ABSTRACT

A method for performing pressure tests on a composite pressure vessel, including providing a composite pressure vessel with at least one opening an injection of a liquid; injecting the liquid in the composite pressure vessel through the at least one opening to reach a threshold pressure; measuring an external volume variation of the composite pressure vessel; draining the liquid from the composite pressure vessel through the at least one opening; and drying an inside cavity of the composite pressure vessel with a drying gas. The drying the inside cavity of the composite pressure vessel is performed at a pressure inside the com-
(Continued)

posite pressure vessel, which is lower than an external pressure. A device for manufacturing and pressure testing a composite pressure vessel.

15 Claims, 10 Drawing Sheets

(52) U.S. Cl.
CPC .................. *F17C 2201/056* (2013.01); *F17C 2203/0619* (2013.01); *F17C 2203/0663* (2013.01); *F17C 2221/012* (2013.01); *F17C 2221/033* (2013.01); *F17C 2221/035* (2013.01); *F17C 2223/0123* (2013.01); *F17C 2250/04* (2013.01); *F17C 2250/043* (2013.01); *F17C 2260/035* (2013.01); *F17C 2260/042* (2013.01); *F17C 2270/0168* (2013.01)

(58) Field of Classification Search
CPC ........ F17C 2203/0663; F17C 2221/012; F17C 2221/033; F17C 2221/035; F17C 2223/0123; F17C 2250/04; F17C 2250/043; F17C 2260/035; F17C 2260/042; F17C 2270/0168
See application file for complete search history.

(56) References Cited

U.S. PATENT DOCUMENTS

| | | | | |
|---|---|---|---|---|
| 5,462,193 A | * | 10/1995 | Schoo | F17C 1/16 220/652 |
| 5,758,795 A | * | 6/1998 | Johnson | B29C 53/824 220/501 |
| 5,865,923 A | * | 2/1999 | Johnson | B60T 17/06 156/173 |
| 9,188,284 B2 | * | 11/2015 | Luo | F17C 11/007 |
| 2003/0148527 A1 | | 8/2003 | Prasad | |
| 2004/0026417 A1 | | 2/2004 | Kikkawa et al. | |
| 2008/0149636 A1 | * | 6/2008 | Carter | F17C 1/06 220/62.22 |
| 2015/0308914 A1 | | 10/2015 | Wylde et al. | |
| 2017/0042145 A1 | | 2/2017 | Wylde et al. | |

FOREIGN PATENT DOCUMENTS

| | | | | |
|---|---|---|---|---|
| JP | 2001-108588 | | 4/2001 | |
| JP | 2018-141747 | | 9/2018 | |
| KR | 20230004613 A | * | 1/2023 | |
| WO | WO-2017091223 A1 | * | 6/2017 | ............ F17C 11/005 |
| WO | WO-2021255041 A1 | * | 12/2021 | ................ F17C 1/16 |

OTHER PUBLICATIONS

"Hydrostatic Testing", Inspectioneering, X9055826784, Mar. 19, 2015, 3 pages.

"Schedule Your Winter Hydro Testing Programs with Pipeline Hydrostatic Test Fluid", Novamen Inc., XP055826953, Aug. 4, 20216, 2 pages.

Japanese Office Action Issued Feb. 12, 2025, in Japanese Patent Application No. 2022-664429 filed Apr. 22, 2021, 12 pages.

* cited by examiner

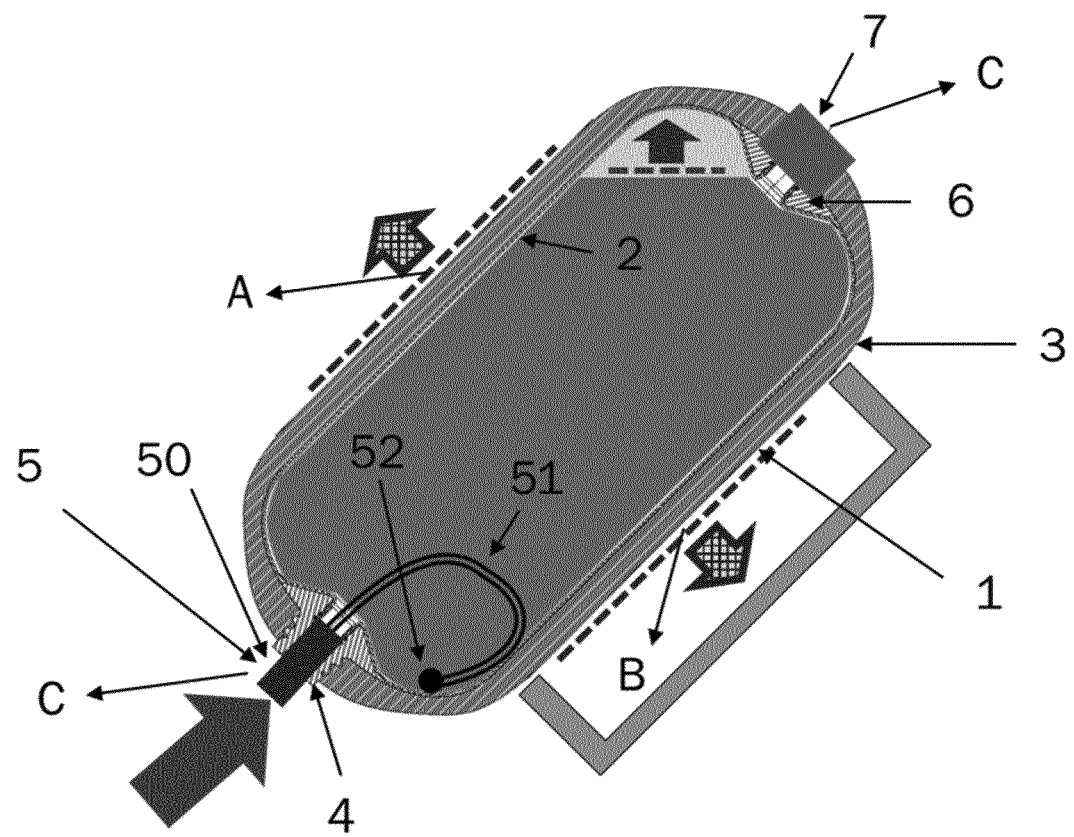
Fig; 17
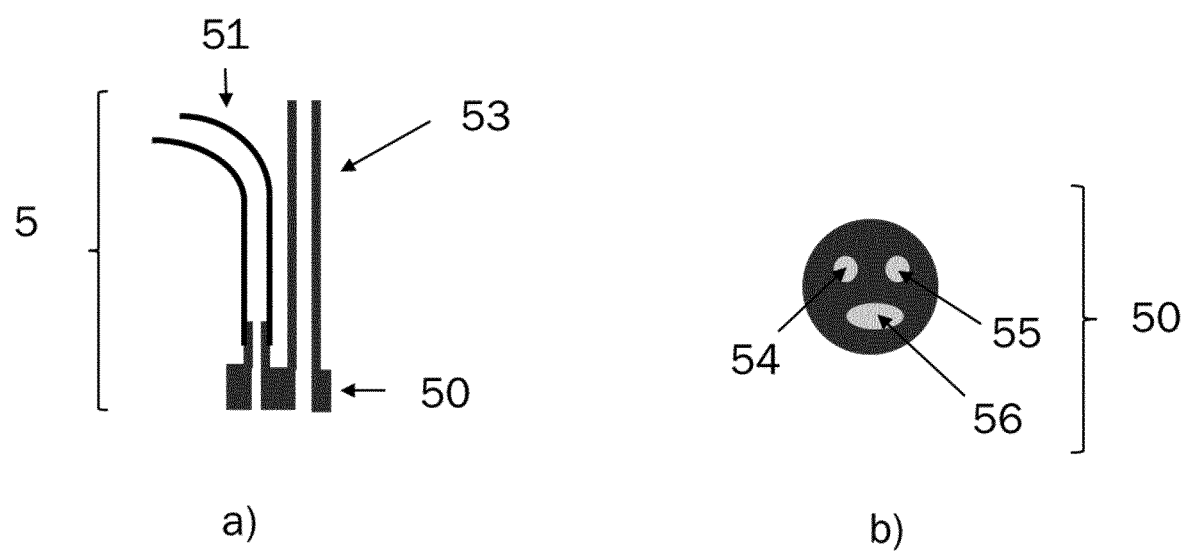
a)     b)
Fig. 18

METHOD FOR PERFORMING PRESSURE TESTS ON A COMPOSITE PRESSURE VESSEL AND DEVICE FOR MANUFACTURING AND PRESSURE TESTING THE COMPOSITE PRESSURE VESSEL

CROSS REFERENCE TO RELATED APPLICATIONS

This application is a National Stage entry under 35 U.S.C. § 371 of PCT/EP2021/060581, filed on Apr. 22, 2021, and claims priority to European Patent Application No. 20170802.1, filed on Apr. 22, 2020, the entire contents of which are incorporated herein by reference.

TECHNICAL FIELD OF THE INVENTION

The present invention concerns a method for performing pressure tests on a composite pressure vessel used as compressed natural gas (CNG) tanks, compressed hydrogen gas (CHG) tanks, liquefied petroleum gas (LPG) tanks, and the like. In particular, the present invention relates to a method for manufacturing a composite pressure vessel. More specifically, the invention concerns also a device for manufacturing and testing a composite pressure vessel.

BACKGROUND OF THE INVENTION

The methods at present used for manufacturing and testing composite pressure vessels are very tedious, time-intensive and labour-intensive.

A known solution to test the pressure resistance of a composite pressure vessel consists in a hydrostatic test requiring a step of injecting water in the composite pressure vessel. Unfortunately, due to the physical and chemical interactions between the surface of the inside cavity of the composite pressure vessel and water, a certain amount of water may remain after the test, which may induce a pollution of the stored gas and requires time-intensive drying step by blowing a gas in the composite pressure vessel at ambient temperature and under atmospheric pressure.

SUMMARY OF THE INVENTION

The present disclosure provides a method for performing pressure tests on a composite pressure vessel commonly used as compressed natural gas (CNG) tanks, compressed hydrogen gas (CHG) tanks, liquefied petroleum gas (LPG) tanks, which overcomes the foregoing problems heretofore existing in the industry. More particularly, the present disclosure provides a method for manufacturing a composite pressure vessel, which is less time-intensive. Finally, the present disclosure provides a device for manufacturing and testing a composite pressure vessel.

In particular, it is a first objective of the present disclosure to provide a method for performing pressure tests on a composite pressure vessel, which is less tedious, time-intensive and labour-intensive.

A second objective of the present disclosure is to provide a method for manufacturing a composite pressure vessel having reduced manufacturing time.

A third objective of the present disclosure is to provide a device for manufacturing and testing a composite pressure vessel.

A fourth objective of the present invention is to provide a pressure testing equipment for a composite pressure vessel.

It is a first object of the present invention to provide a method for performing pressure tests on a composite pressure vessel achieving these objectives. The method for performing pressure tests on a composite pressure vessel of according to the invention comprises the steps of:

a. Providing a composite pressure vessel comprising at least one opening, preferably a single opening, for an injection of a liquid;
b. Injecting the liquid in the composite pressure vessel through the at least one opening to reach a threshold pressure;
c. Measuring an external volume variation of the composite pressure vessel
d. Draining the liquid from the composite pressure vessel through the at least one opening:
e. Drying the inside cavity of the composite pressure vessel using a drying gas;

wherein the step of drying the inside cavity of the composite pressure vessel is performed at a pressure inside the composite pressure vessel, which is lower than an external pressure.

The use of a pressure inside the composite pressure vessel that is lower than the external pressure permits to accelerate the ebullition and the vaporization of the remaining liquid present in the composite pressure vessel after the step d. of draining the liquid from the composite pressure vessel and thus leads to a quicker elimination of said liquid. Preferably, the external pressure is the atmospheric pressure.

The composite pressure vessels according to the present disclosure are composite pressure vessels of the type IV comprising an inner liner made of unforced polymer and forming an inner cavity, enclosed in a fibre reinforced polymer shell or composite pressure vessels of the type III comprising a metallic liner enclosed in a fiber reinforced polymer shell or composite pressure vessels of the type V consisting of a fibre polymer shell. Preferably, composite pressure vessels according to the present disclosure are composite pressure vessels of the type IV comprising an inner liner made of unforced polymer and forming an inner cavity, enclosed in a fibre reinforced polymer shell By the expression "the external pressure", we intend to mean the pressure applied on the external surface of the fiber reinforced polymer shell.

By the expression "the pressure inside the composite pressure vessel is lower than the external pressure", we intend to mean that the pressure inside the composite pressure vessel is reduced compared to the ambient atmospheric pressure in order to accelerate the vaporization of the remaining liquid. At the same time the pressure applied outside the composite pressure vessel may be reduced as well so that the difference between the inner and external pressure is such that it avoids a collapsing of the inner liner vessel when the composite pressure vessel is a type III or IV pressure vessel. Preferably, the pressure inside the composite pressure vessel remains higher than the external pressure. Some pressure vessel constructions allow for a certain level of negative relative pressure inside the vessel, which could be acceptable while avoiding a collapsing of the inner liner when the composite pressure vessel is a type III or IV pressure vessel.

By the expression "inside cavity of the composite pressure vessel", we intend to mean the cavity wherein a compressed gas is stored.

The step of drying the inside cavity of the composite pressure vessel is a step of drying the inner liner of the composite pressure vessel when the composite pressure vessel is a type III or IV pressure vessel.

The at least one at least one opening of the composite pressure vessel comprises a first boss. Preferably, the composite pressure vessel comprises a second boss, preferably located on the opposite side of the composite pressure vessel regarding the first boss. The second boss is not necessary located on an opening.

According to an embodiment, the method for performing pressure tests on a composite pressure vessel according to the invention is such that said method comprises a step of heating the composite pressure vessel.

A step of heating the composite pressure vessel permits to eliminate the remaining liquid still present after the step of draining of the liquid from the composite pressure vessel through at least one opening. Moreover, it permits to perform the pressure test at different temperature.

The method for performing pressure tests on a composite pressure vessel according to the invention can include a step of heating the liquid used to perform the pressure test. Preferably the temperature used during the step of heating as measured inside the composite pressure vessel, is higher than the ebullition temperature of the liquid, at the pressure used during the drying step e.

According to a preferred embodiment, the method for performing pressure tests on a composite pressure vessel according to the invention is such that said method comprises a step of heating the composite pressure vessel comprises a radiative heating step, during which a heat-radiating device is introduced through at least one opening inside the composite pressure vessel. Preferably, the heat-radiating device is producing a radiative wave within a bandwidth maximizing the heat absorption by the inner surface of the inside cavity of the composite pressure vessel. The radiative power is controlled in order to avoid overheating of the inner surface of the inside cavity of the composite pressure vessel.

Preferably, the step of heating the composite pressure vessel is performed during the step of drying the inside cavity of the composite pressure vessel. This permits to reduce the time needed to perform the method for performing pressure tests on a composite pressure vessel.

According to a preferred embodiment, the method for performing pressure tests on a composite pressure vessel according to the invention is such that the liquid used to perform the pressure test is a liquid having a contact angle with the surface of the inside cavity of the composite pressure vessel higher than the contact angle of water with the surface of the inside cavity.

A liquid having a higher contact angle than water will tend to adhere less to the surface of the inside cavity and thus will be more easily evacuate by blowing a gas inside the composite pressure vessel.

According to a preferred embodiment, the method for performing pressure tests on a composite pressure vessel according to the invention is such that the liquid has a temperature of vaporization lower than the temperature of vaporization of water at the atmospheric pressure.

The use of a liquid having a temperature of vaporization lower than the temperature of vaporization of water at pressure conditions, preferably at the atmospheric pressure, permits to accelerate the step of drying.

According to a preferred embodiment, the method for performing pressure tests on a composite pressure vessel according to the invention is such that the liquid used to perform the pressure test is selected from the group consisting of water, acetone, methanol, ethanol, isopropanol, butyl alcohol and the mixture of at least two thereof.

According to a particular embodiment, the method for performing pressure tests on a composite pressure vessel according to the invention is such that the drying gas is selected from the group consisting of $N_2$, Ar, He, $H_2$ or a mixture of at least two thereof.

The use of inert gas such as $N_2$, Ar, He, $H_2$ or a mixture of at least two thereof as drying gas permits to avoid a contamination of the composite pressure vessel, especially in the case of the storage of compressed hydrogen gas ($H_2$).

According to an alternative embodiment of the precious one, the method for performing pressure tests on a composite pressure vessel according to the invention is such that the drying gas is air.

The use of air as drying gas permits to simplify the method of testing. Preferably, the use of air as drying gas is limited to composite pressure vessel used for the storage of compressed natural gas (CNG) or liquefied petroleum gas (LPG).

According to a preferred embodiment, the method for performing pressure tests on a composite pressure vessel according to the invention is such that the drying gas is heated.

The use of a heated drying gas leads to an increase of the speed of the method, thus reducing the total cycle time to perform the testing.

According to a preferred embodiment, the method for performing pressure tests on a composite pressure vessel is such that said method comprises a step of rinsing with a solvent forming an azeotrope with the liquid injected at step a).

It is a second object of the present invention to provide a method for manufacturing a composite pressure vessel. The method for manufacturing a composite pressure vessel according to the invention comprises the method for performing pressure tests on a composite pressure vessel disclosed hereabove.

According to a preferred embodiment, the method for manufacturing a composite pressure vessel according to the invention comprises a step of fixing a valve assembly on the composite pressure vessel after the step of drying the inside cavity of the composite pressure vessel using a gas. Preferably, the step of fixing the valve assembly is performed directly after the step of drying the inside cavity of the composite pressure vessel, leading to decrease the contamination problem of the composite pressure by external pollutants like dust or moisture for example. The valve assembly is fixed onto the composite pressure vessel using the first boss. Preferably, the valve assembly is fixed on the first boss by screwing or by using a cam-lock or a fixing ring nut. Said valve assembly is an OTV valve assembly.

According to a preferred embodiment, the method for manufacturing a composite pressure vessel according to the invention comprises an additional step of heating. Said step of heating is a step of heating the composite pressure vessel and/or a step of heating a gas blown inside the composite pressure vessel.

It is a third object of the present invention to provide a device for manufacturing and pressure testing a composite pressure vessel, said device comprising a first chamber and a second chamber, wherein the first chamber comprises a means for pressure testing of the composite pressure vessel and the second chamber comprises a means for drying the inside cavity of the composite pressure vessel.

The means for pressure testing the composite pressure vessel comprises at least an first adaptor to connect an opening of the composite pressure vessel to a circuit for injecting a liquid inside the composite pressure vessel, optionally a means to reduce the pressure inside the first chamber, a means for measuring the length and diameter expansion and a means to drain the liquid outside de composite pressure vessel.

The means for drying the inside cavity of the composite pressure vessel comprises at least a second adaptor to connect an opening of the composite pressure vessel to a circuit for injecting a drying gas inside the composite pressure vessel. The means for drying the inside cavity of the composite pressure vessel may also comprises a means to apply a vacuum inside and outside the composite pressure vessel if needed. Preferably, the means for drying the inside cavity, preferably the inner liner, comprises also a means for heating the composite pressure vessel and a means for heating the drying gas. Preferably, the means for heating is a radiative heating source.

According to a preferred embodiment, the device for manufacturing and pressure testing a composite pressure vessel is such that the second chamber comprises means of for fixing a valve assembly on an opening of the composite pressure vessel.

According to an alternative embodiment, the device for manufacturing and pressure testing a composite pressure vessel comprises a first chamber, a second chamber and a third chamber, wherein the first chamber comprises means for pressure testing of the composite pressure vessel, the second chamber comprises means for draining the liquid and blowing a gas and the third chamber comprises means for drying the inside cavity of the composite pressure vessel.

It is a fourth object of the present invention to provide a pressure testing equipment for a composite pressure vessel, said pressure testing equipment comprises:
 a sleeve adaptor assembly comprising a suction point, a suction line and a first fixing means configured for fixing the sleeve adaptor assembly to a first boss of the composite pressure vessel;
 a proof test adaptor assembly comprising a second fixing means for fixing the proof test adaptor assembly to the first boss and a first connecting means for connecting the composite pressure vessel to a liquid circuit;
 a means for measuring composite pressure vessel deformation;
 a first chamber, which is a burst containment chamber.

According to a preferred embodiment, the pressure testing equipment for a composite pressure vessel is such that the first chamber comprises means for pressure testing of the composite pressure vessel According to a preferred embodiment, the pressure testing equipment for a composite pressure vessel comprises a second chamber comprising means for draining the liquid and blowing a gas According to a preferred embodiment, the pressure testing equipment for a composite pressure vessel comprises a third chamber comprising means for drying the inside cavity of the composite pressure vessel.

According to a preferred embodiment, the first fixing means for fixing the sleeve adaptor assembly to the first boss comprises a plurality of openings, at least two, more preferably at least three openings.

This and other advantages of the present invention are explained more in details in the following sections.

BRIEF DESCRIPTION OF THE DRAWINGS

The present disclosure will be better understood on reading the following examples, including figures, which are given by way of example.

FIG. 1 is a vertical cross-section of a composite pressure vessel during a step of the method for performing pressure tests on a composite pressure vessel according to the invention.

FIG. 2 is a vertical cross-section of a composite pressure vessel during a step of the method for performing pressure tests on a composite pressure vessel according to the invention.

FIG. 3 is a vertical cross-section of a composite pressure vessel during a step of the method for performing pressure tests on a composite pressure vessel according to the invention.

FIG. 4 is a vertical cross-section of a composite pressure vessel during a step of the method for performing pressure tests on a composite pressure vessel according to the invention.

FIG. 5 is a vertical cross-section of a composite pressure vessel during a step of the method for performing pressure tests on a composite pressure vessel according to the invention.

FIG. 6 is a vertical cross-section of a composite pressure vessel during a step of the method for performing pressure tests on a composite pressure vessel according to the invention.

FIGS. 7, 8 and 9 are vertical cross-sections of a composite pressure vessel during a step of the method for performing pressure tests on a composite pressure vessel according to the invention.

FIG. 10 is a vertical cross-section of a composite pressure vessel during a step of the method for performing pressure tests on a composite pressure vessel according to the invention.

FIG. 11 is a vertical cross-section of a composite pressure vessel during a step of the method for performing pressure tests on a composite pressure vessel according to the invention.

FIG. 12 is a vertical cross-section of a composite pressure vessel during a step of the method for performing pressure tests on a composite pressure vessel according to the invention.

FIG. 13 is a vertical cross-section of a composite pressure vessel during a step of the method for performing pressure tests on a composite pressure vessel according to the invention.

FIG. 14 is a vertical cross-section of a composite pressure vessel during a step of the method for performing pressure tests on a composite pressure vessel according to the invention.

FIG. 15 is a vertical cross-section of a composite pressure vessel during a step of the method for manufacturing a composite pressure vessel according to the invention.

FIG. 16 is a vertical cross-section of a composite pressure vessel during a step of the method for manufacturing a composite pressure vessel according to the invention.

FIG. 17 is a vertical cross-section of a composite pressure vessel during a step of the method for performing pressure tests on a composite pressure vessel according to the invention.

FIG. 18 is a detailed sketch of a sleeve adaptor assembly used in the methods of the manufacturing and testing composite pressure vessel according to the invention.

DESCRIPTION OF ILLUSTRATIVE EMBODIMENTS

The present invention will be described with respect to particular embodiments

Figure 1:
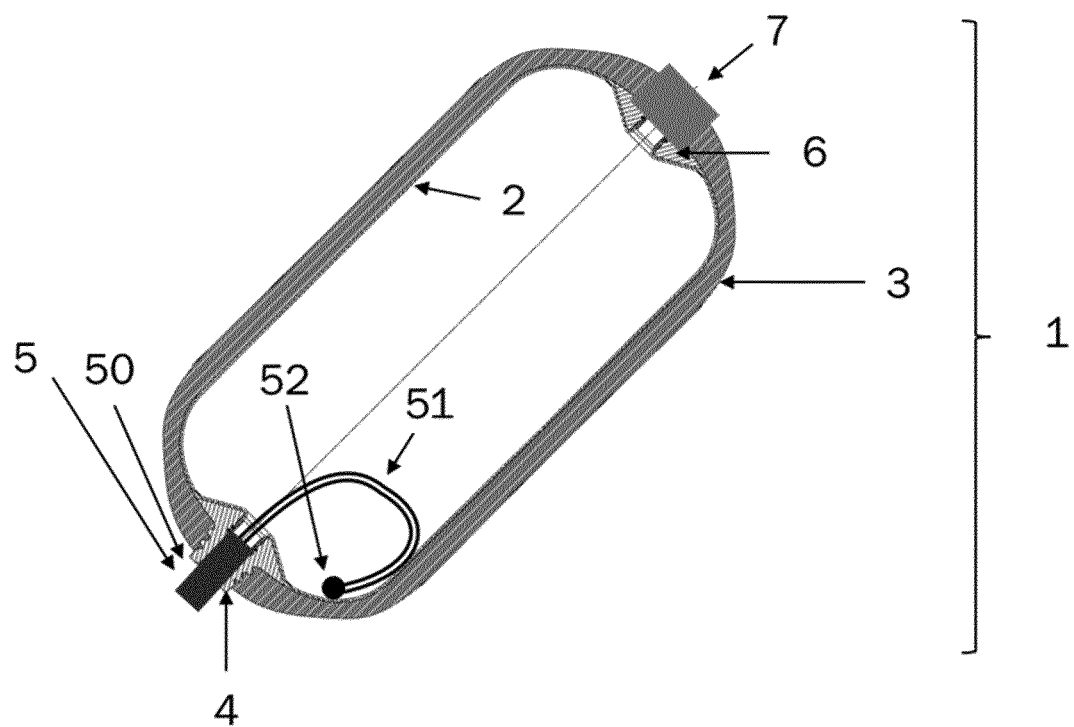
FIGS. 1 to 16 are vertical cross-section of a composite pressure vessel during different steps of the manufacturing and testing methods according to the invention.

FIG. 1 presents a composite pressure vessel (1) during a step of the method for performing pressure tests according to the invention. The composite pressure vessel (1) comprises an inner liner (2) made of unreinforced polymer and forming an inner cavity, enclosed in a fiber reinforced polymer shell (3). The composite pressure vessel comprises a first boss (4) and a second boss (6). A cap (7) closing the second boss (6) is fixed on the second boss. The cap (7) and the second boss (6) are monoblock when the composite pressure vessel requires only one service opening in using. During this step, a sleeve adaptor assembly (5) is fixed on the first boss (4). Said sleeve adaptor assembly comprise a suction point (52), a suction line (51) and a first fixing means (50) for fixing the sleeve adaptor assembly (5) to the first boss (4).

Figure 2:
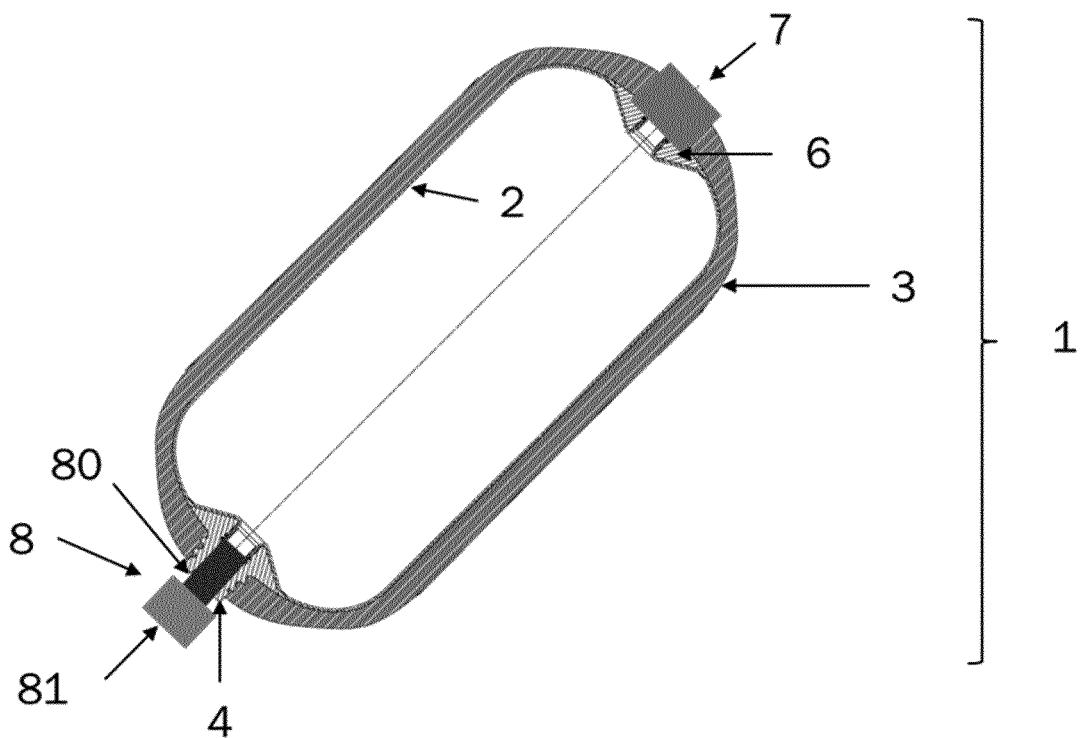

FIG. 2 presents a composite pressure vessel (1) during a step of the method for performing pressure tests according to the invention. The composite pressure vessel (1) comprises an inner liner (2) made of unreinforced polymer and forming an inner cavity, enclosed in a fiber reinforced polymer shell (3). The composite pressure vessel comprises a first boss (4) and a second boss (6). A cap (7) closing the second boss (6) is fixed on the second boss. The cap (7) and the second boss (6) are monoblock when the composite pressure vessel requires only one service opening in using. During this step, a proof test adaptor assembly (8) is fixed to the first boss (4). Said proof test adaptor assembly (8) comprises a second fixing means (80) for fixing the proof test adaptor assembly (8) to the first boss (4) and a first connecting means (81) for connecting the composite pressure vessel (1) to a liquid circuit.

Figure 3:
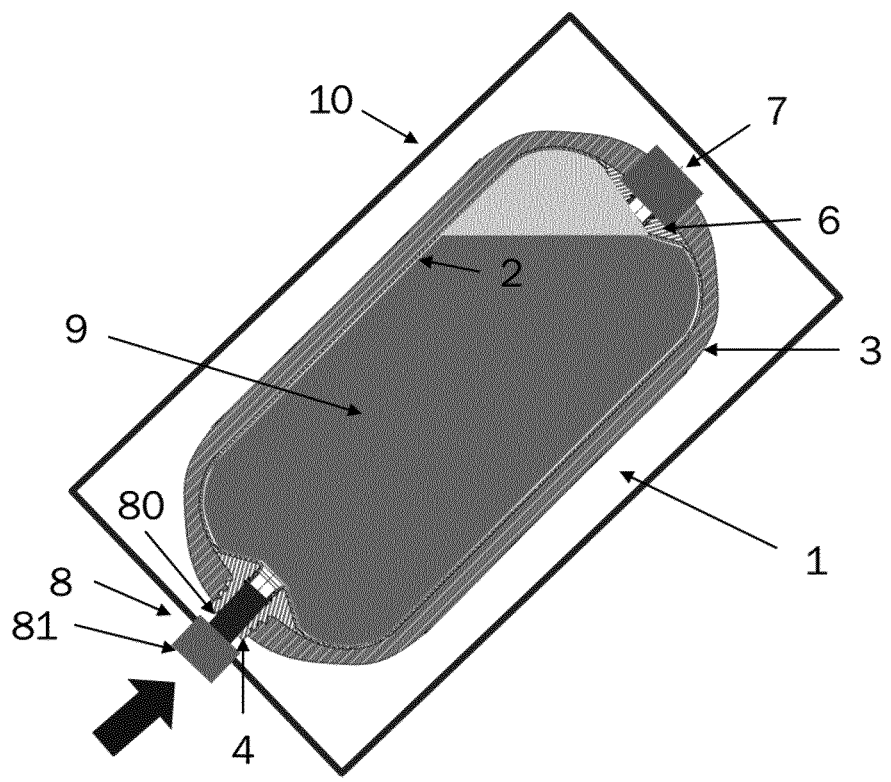

FIG. 3 presents a composite pressure vessel (1) during a step of the method for performing pressure tests according to the invention. The composite pressure vessel (1) comprises an inner liner (2) made of unreinforced polymer and forming an inner cavity, enclosed in a fibre reinforced polymer shell (3). The composite pressure vessel comprises a first boss (4) and a second boss (6). A cap (7) closing the second boss (6) is fixed on the second boss. The cap (7) and the second boss (6) are monoblock when the composite pressure vessel requires only one service opening in using. During this step, a proof test adaptor assembly (8) is fixed to the first boss (4). Said proof test adaptor assembly (8) comprises a second fixing means (80) for fixing the proof test adaptor assembly (8) to the first boss (4) and a first connecting means (81) for connecting the composite pressure vessel (1) to a liquid circuit. The composite pressure vessel (1) is filled with a liquid (9) via the proof test adaptor (8) to reach a threshold pressure, which is a pressure test that is 1.5 times the nominal working pressure according to known regulations. The step of injecting the liquid in the composite pressure vessel to reach the threshold pressure is performed in a first chamber (10), which is a burst containment chamber (10).

Figure 4:
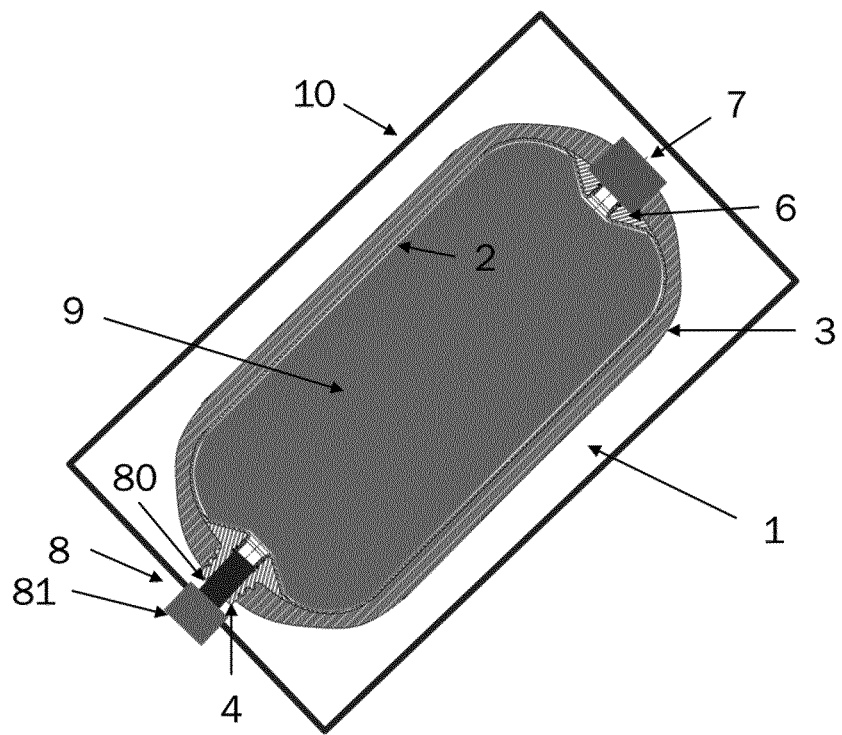

FIG. 4 presents a composite pressure vessel (1) during a step of the method for performing pressure tests according to the invention. The composite pressure vessel (1) comprises an inner liner (2) made of unreinforced polymer and forming an inner cavity, enclosed in a fibre reinforced polymer shell (3). The composite pressure vessel comprises a first boss (4) and a second boss (6). A cap (7) closing the second boss (6) is fixed on the second boss. The cap (7) and the second boss (6) are monoblock when the composite pressure vessel requires only one service opening in using. During this step, a proof test adaptor assembly (8) is fixed to the first boss (4). Said proof test adaptor assembly (8) comprises a second fixing means (80) for fixing the proof test adaptor assembly (8) to the first boss (4) and a first connecting means (81) for connecting the composite pressure vessel (1) to a liquid circuit. The composite pressure vessel (1) is filled with a liquid (9) via the proof test adaptor (8) to reach a threshold pressure inside the composite pressure vessel (1), which is a pressure test of 1050 bar. Said pressure test is maintained during the testing period. The test is performed in the first chamber (10), which is a burst containment chamber (10). Said test comprises the step of measuring an external volume variation of the composite pressure vessel.

Figure 5:
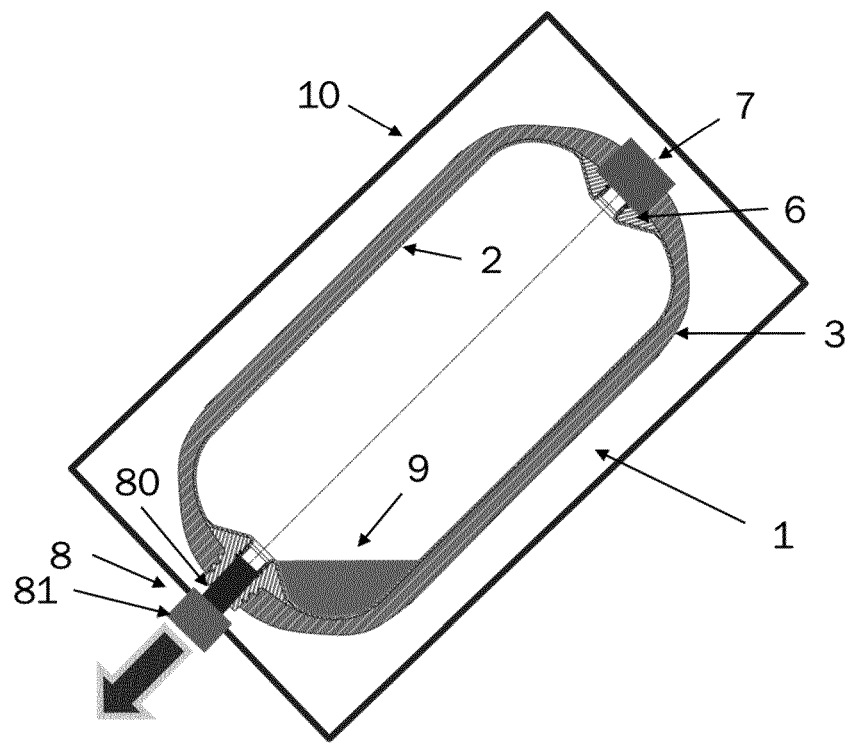

FIG. 5 presents a composite pressure vessel (1) during a step of the method for performing pressure tests according to the invention. The composite pressure vessel (1) comprises an inner liner (2) made of unreinforced polymer and forming an inner cavity, enclosed in a fibre reinforced polymer shell (3). The composite pressure vessel comprises a first boss (4) and a second boss (6). A cap (7) closing the second boss (6) is fixed on the second boss. The cap (7) and the second boss (6) are monoblock when the composite pressure vessel requires only one service opening in using. During this step, a proof test adaptor assembly (8) is fixed to the first boss (4). Said proof test adaptor assembly (8) comprises a second fixing means (80) for fixing the proof test adaptor assembly (8) to the first boss (4) and a first connecting means (81) for connecting the composite pressure vessel (1) to a liquid circuit. The composite pressure vessel (1) is drained off the liquid (9) via the proof test adaptor (8). The draining step is performed in the first chamber (10), which is a burst containment chamber (10).

Figure 6:
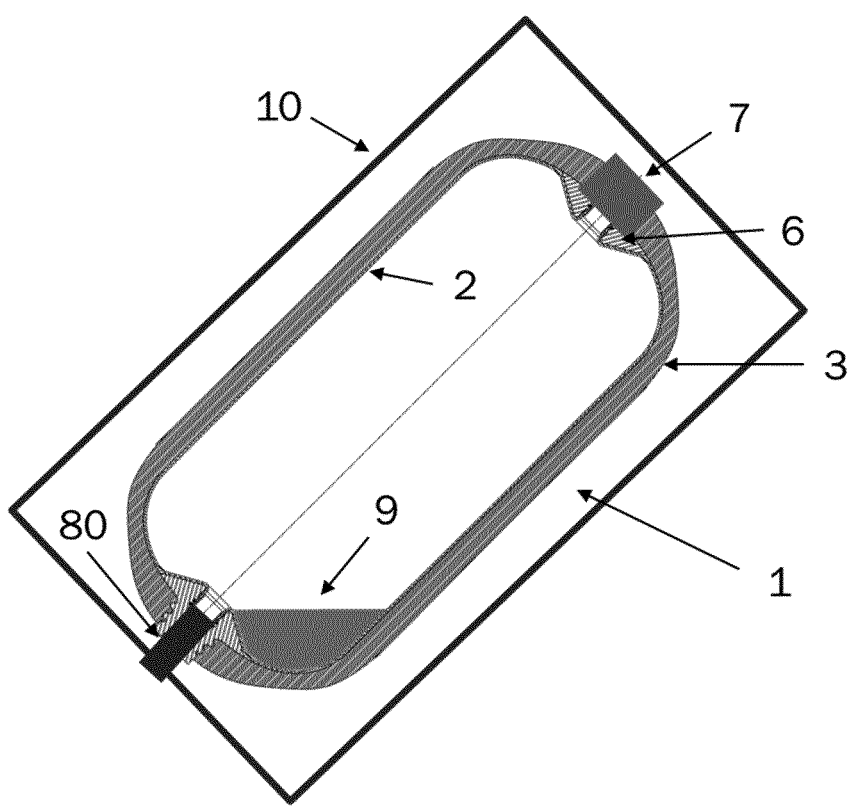

FIG. 6 presents a composite pressure vessel (1) during a step of the method for performing pressure tests according to the invention. The composite pressure vessel (1) comprises an inner liner (2) made of unreinforced polymer and forming an inner cavity, enclosed in a fibre reinforced polymer shell (3). The composite pressure vessel comprises a first boss (4) and a second boss (6). A cap (7) closing the second boss (6) is fixed on the second boss. The cap (7) and the second boss (6) are monoblock when the composite pressure vessel requires only one service opening in using. The FIG. 6 presents the end of the draining step and shows that a certain quantity of liquid may remain inside the composite pressure vessel (1). During this step, the proof test adaptor assembly is disassembled. The second fixing means (80) remains fixed to the first boss (4), the first connecting means for connecting the composite pressure vessel (1) to the liquid circuit being withdrawn.

Figure 7:
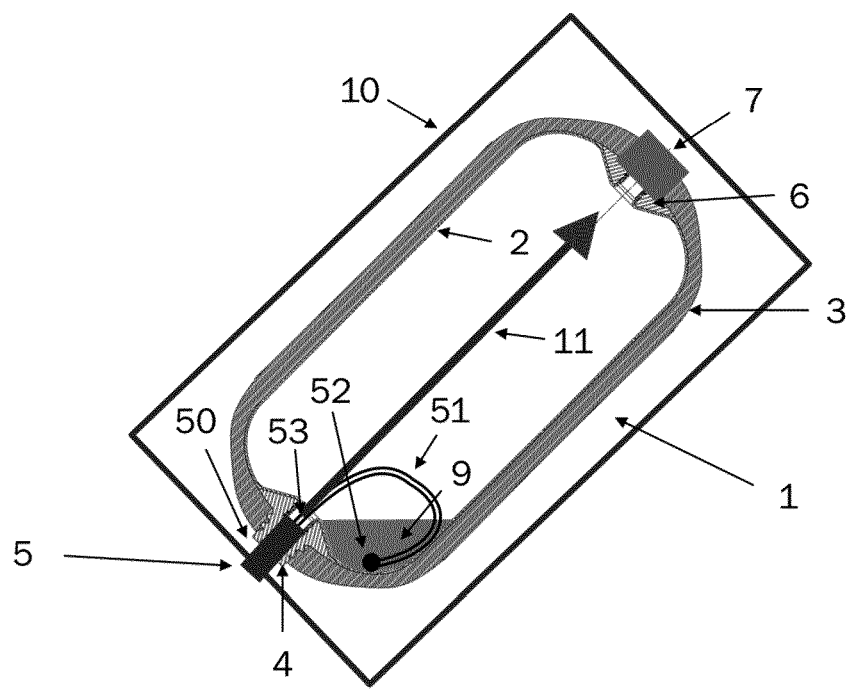
Figure 8:
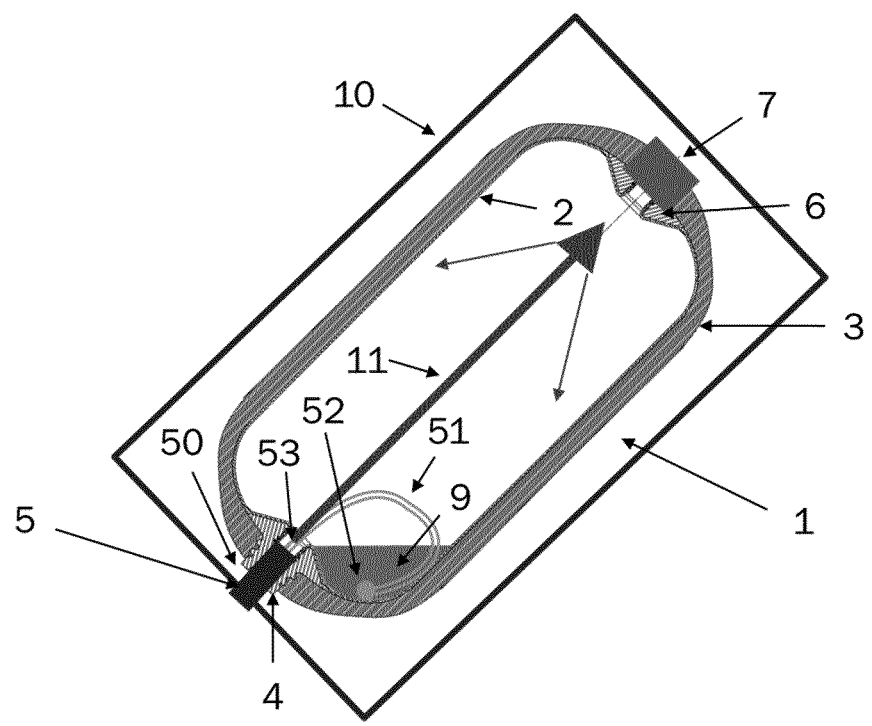
Figure 9:
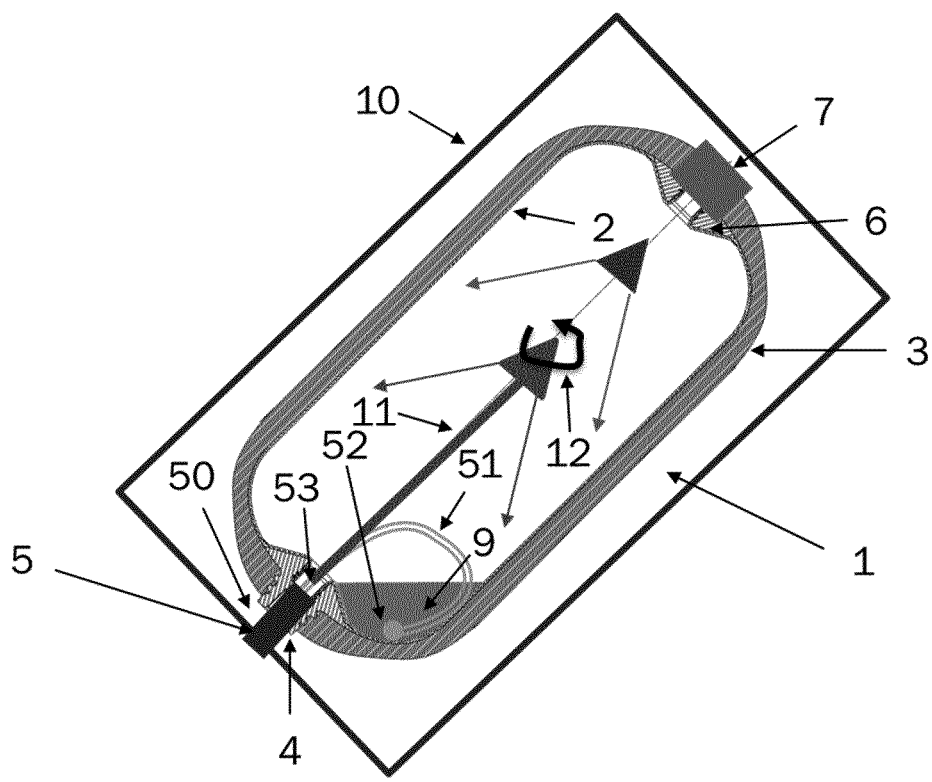

FIGS. 7, 8 and 9 presents a composite pressure vessel (1) during a step of the method for performing pressure tests according to the invention. The composite pressure vessel (1) comprises an inner liner (2) made of unreinforced polymer and forming an inner cavity, enclosed in a fibre reinforced polymer shell (3). The composite pressure vessel comprises a first boss (4) and a second boss (6). During this step, a cap (7) closing the second boss (6) is fixed on the second boss. The cap (7) and the second boss (6) are monoblock when the composite pressure vessel requires only one service opening in using. During this step, a sleeve adaptor assembly (5) is fixed on the first boss (4). Said sleeve adaptor assembly (5) comprises a suction point (52), a suction line 51), a first fixing means (50) for fixing the sleeve adaptor assembly (5) to the first boss (4) and a pipe (53) for blowing a gas inside the composite vessel pressure. A gas is blown inside the composite pressure vessel (1) represented by the arrow (11). The remaining liquid (9) is drained off the composite pressure vessel (1) through the sleeve adaptor assembly via the suction point (52) and the suction line (51) using the gas blown, which is air. The draining step is performed in the first chamber (10), which is a burst containment chamber (10). FIG. 9 shows that possible rotational (12) and/or transversal movements of the suction point (52) and the suction line (51) and/or the pipe (53) inside the composite vessel pressure (1) may be generated during the draining step in order to optimize the liquid draining. The second fixing means of the test adaptor assembly may be used as first fixing means (50) of the sleeve adaptor assembly (5) or replaced by said first fixing means (50).

Figure 10:
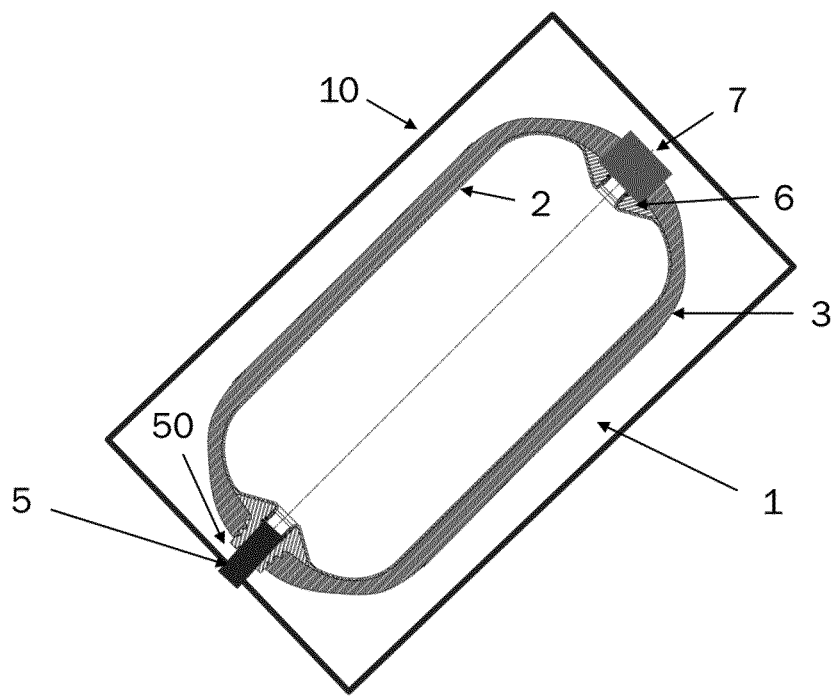

FIG. 10 present a composite pressure vessel (1) during a step of the method for performing pressure tests according to the invention, more precisely at the end of the draining step. The composite pressure vessel (1) comprises an inner liner (2) made of unreinforced polymer and forming an inner cavity, enclosed in a fibre reinforced polymer shell (3). The composite pressure vessel comprises a first boss (4) and a second boss (6). A cap (7) closing the second boss (6) is fixed on the second boss. The cap (7) and the second boss (6) are monoblock when the composite pressure vessel requires only one service opening in using. During this step, the sleeve adaptor assembly (5) is disassembled, the suction point, the suction line a pipe for blowing a gas inside the composite vessel pressure are removed. The sole part sleeve adaptor assembly (5) remaining is the first fixing means (50) for fixing the sleeve adaptor assembly (5) to the first boss (4).

Figure 11:
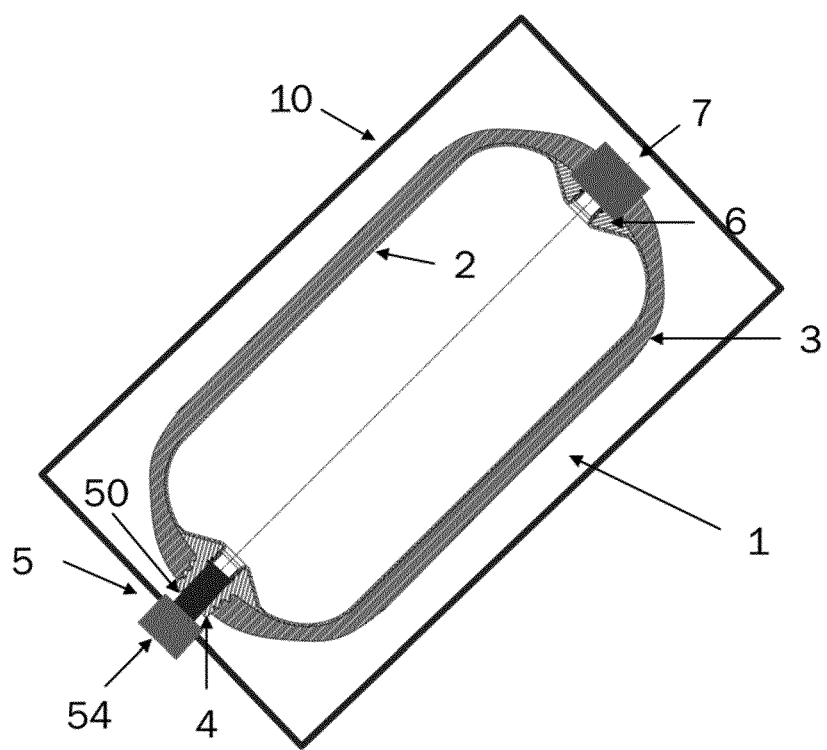

FIG. 11 presents a composite pressure vessel (1) during a step of the method for performing pressure tests according to the invention, before the step of drying the inner liner using a drying gas. The composite pressure vessel (1) comprises an inner liner (2) made of unreinforced polymer and forming an inner cavity, enclosed in a fibre reinforced polymer shell (3). The composite pressure vessel comprises a first boss (4) and a second boss (6). A cap (7) closing the second boss (6) is fixed on the second boss. The cap (7) and the second boss (6) are monoblock when the composite pressure vessel requires only one service opening in using. During this step, a pressure adaptor connector (54) is fixed on the first fixing means (50). Alternatively, the first fixing means (50) of the sleeve adaptor assembly (5) may be replaced by a third fixing means or may be the second fixing means used to fix the proof test adaptor to the composite pressure vessel. The composite pressure vessel is located in a first chamber (10), which is a burst containment chamber (10).

Figure 12:
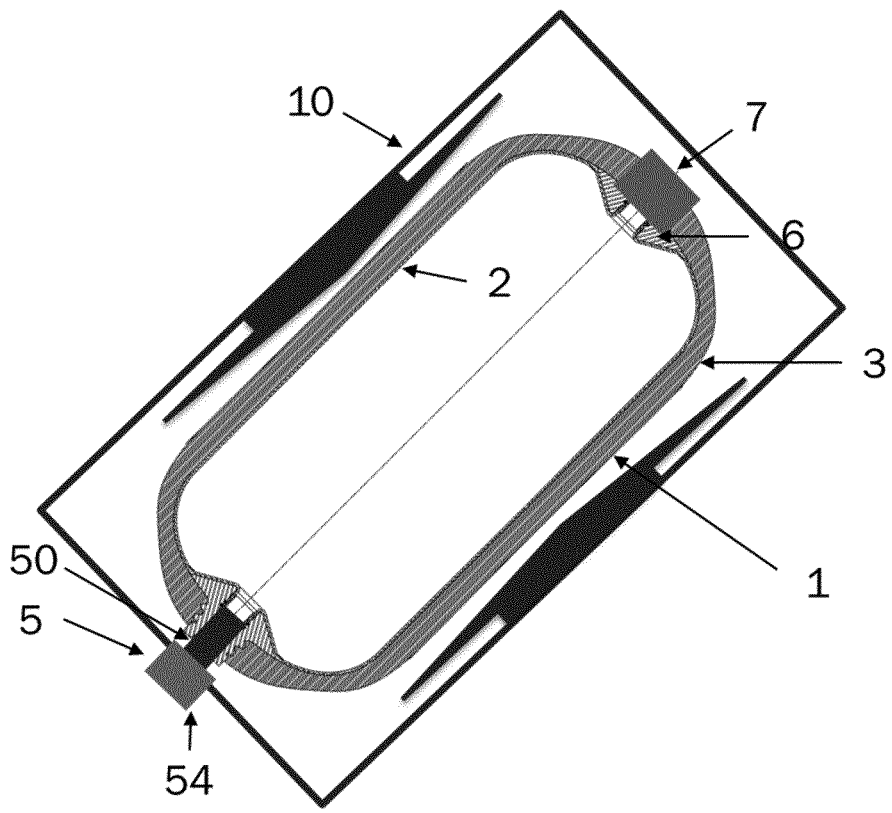

FIG. 12 presents a composite pressure vessel (1) during a step of the method for performing pressure tests according to the invention, which is a possible step of drying the inner liner. The composite pressure vessel (1) comprises an inner liner (2) made of unreinforced polymer and forming an inner cavity, enclosed in a fibre reinforced polymer shell (3). The composite pressure vessel comprises a first boss (4) and a second boss (6). A cap (7) closing the second boss (6) is fixed on the second boss. The cap (7) and the second boss (6) are monoblock when the composite pressure vessel requires only one service opening in using. A pressure adaptor connector (54) is fixed on the first fixing means (50). Alternatively, the first fixing means (50) of the sleeve adaptor assembly (5) may be replaced by a third fixing means or may be the second fixing means used to fix the proof test adaptor to the composite pressure vessel. The composite pressure vessel is located in a first chamber (10), which is a burst containment chamber (10). A vacuum is performed inside the composite pressure vessel in order to eliminate possible traces of liquid. In order to avoid a possible collapsing of the inner layer, a low pressure differential is maintained between the inner side and the outer side of the composite pressure vessel by performing a vacuum in the first chamber (10). In order to accelerate the elimination of the liquid, a heating of the composite pressure vessel may be performed. The heating means are not shown on the FIG. 12.

Figure 13:
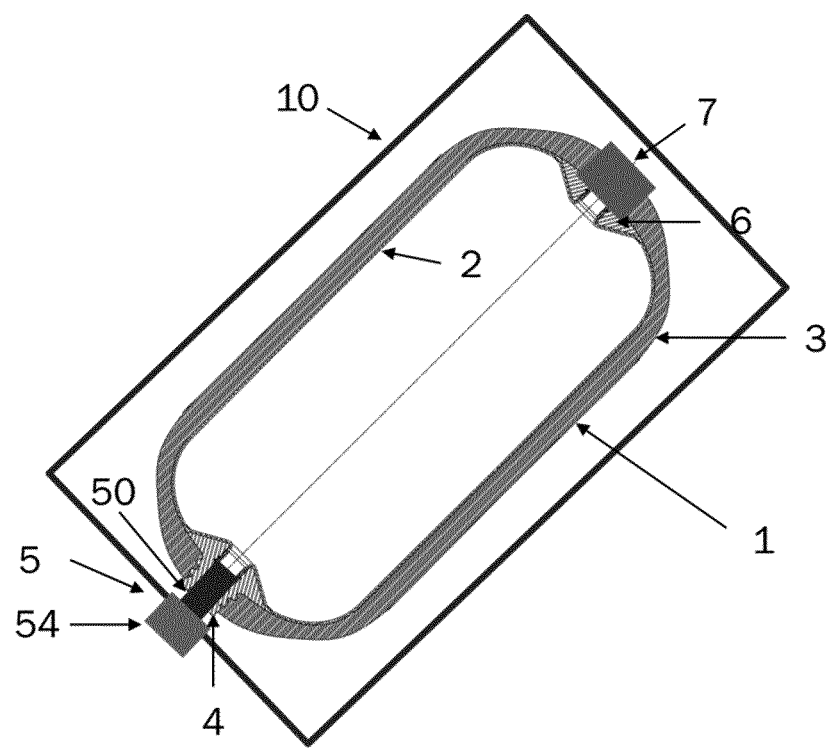

FIG. 13 presents a composite pressure vessel (1) during a step of the method for performing pressure tests according to the invention, which is a possible step of drying the inner liner using a drying gas. The composite pressure vessel (1) comprises an inner liner (2) made of unreinforced polymer and forming an inner cavity, enclosed in a fibre reinforced polymer shell (3). The composite pressure vessel comprises a first boss (4) and a second boss (6). A cap (7) closing the second boss (6) is fixed on the second boss. The cap (7) and the second boss (6) are monoblock when the composite pressure vessel requires only one service opening in using. A pressure adaptor connector (54) is fixed on the first fixing means (50). Alternatively, the first fixing means (50) of the sleeve adaptor assembly (5) may be replaced by a third fixing means or may be the second fixing means used to fix the proof test adaptor to the composite pressure vessel. The composite pressure vessel is located in a first chamber (10), which is a burst containment chamber (10). An inert gas, preferably a heated inert gas, is blown inside the composite pressure vessel (10) leading to a evaporation of the traces of the remaining liquid. Alternatively, the FIG. 13 presents the final step of the method for performing pressure tests on a composite pressure vessel, which comprises the filling of the composite pressure vessel (1) by an inert gas in order to avoid contamination of said composite pressure vessel (1), the internal pressure in the composite pressure vessel (1) being higher than the ambient pressure.

Figure 14:
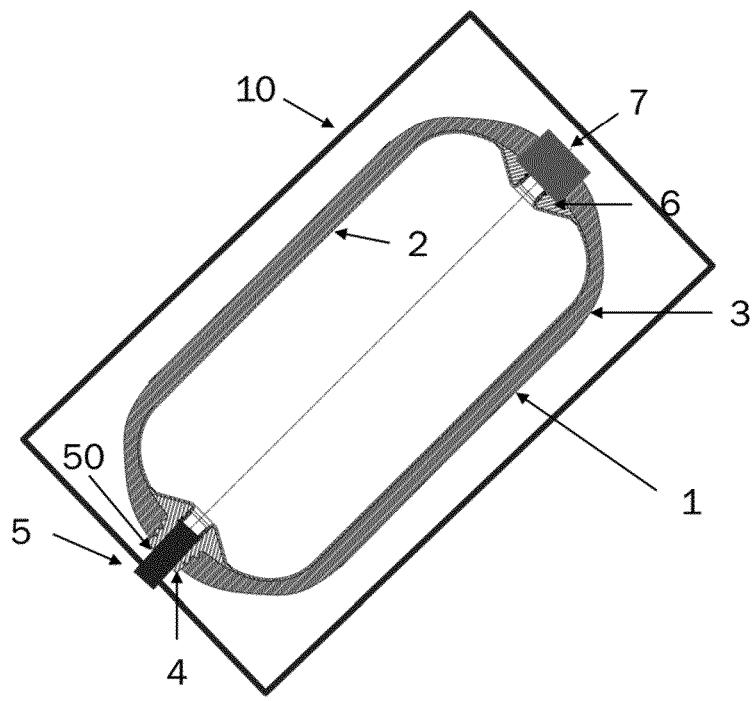

FIG. 14 presents a composite pressure vessel (1) during a step of the method for performing pressure tests according to the invention. The composite pressure vessel (1) comprises an inner liner (2) made of unreinforced polymer and forming an inner cavity, enclosed in a fibre reinforced polymer shell (3). The composite pressure vessel comprises a first boss (4) and a second boss (6). A cap (7) closing the second boss (6) is fixed on the second boss. The cap (7) and the second boss (6) are monoblock when the composite pressure vessel requires only one service opening in using. A pressure adaptor connector (54) is fixed on the first fixing means (50). Alternatively, the first fixing means (50) of the sleeve adaptor assembly (5) may be replaced by a third fixing means or may be the second fixing means used to fix the proof test adaptor to the composite pressure vessel. The composite pressure vessel is located in a first chamber (10), which is a burst containment chamber (10). The composite pressure vessel (1) is filled of the composite pressure vessel (1) by an inert gas, the internal pressure in the composite pressure vessel (1) being higher than the ambient pressure. The first fixing means (50) of the sleeve adaptor assembly (5) or the third fixing means or the second fixing means used to fix the proof test adaptor to the composite pressure vessel is covered by a cap (not) shown and the composite pressure vessel is removed from the first chamber (10) and is stored. Alternatively, the FIG. 13 presents a step of the manufacturing method of a composite gas according to the invention before the step of fixing a valve on the composite vessel. In this case, the first chamber is a second chamber if the testing and the manufacturing are not performed in the same chamber, preferably the first chamber is also the second chamber.

Figure 15:
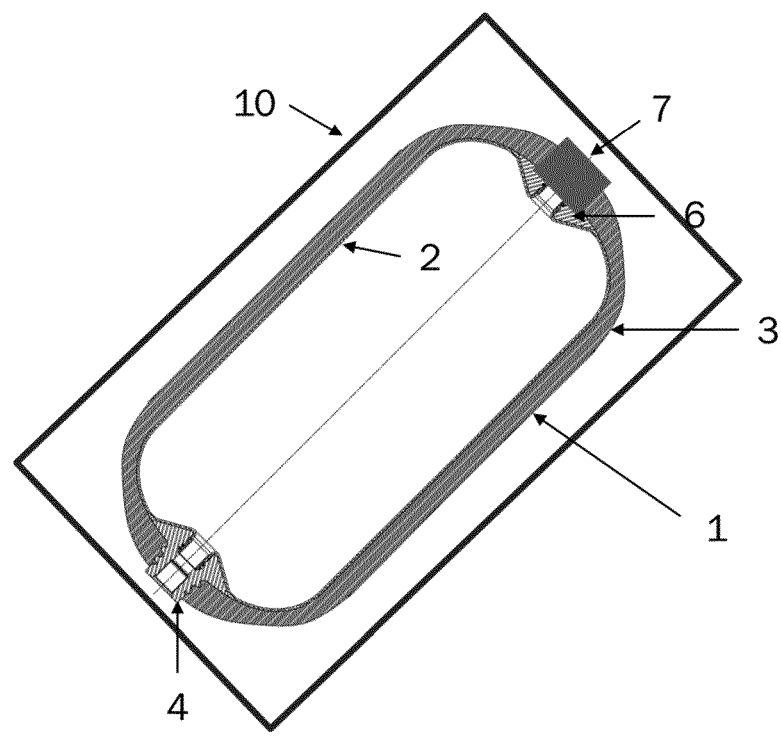
Figure 16:
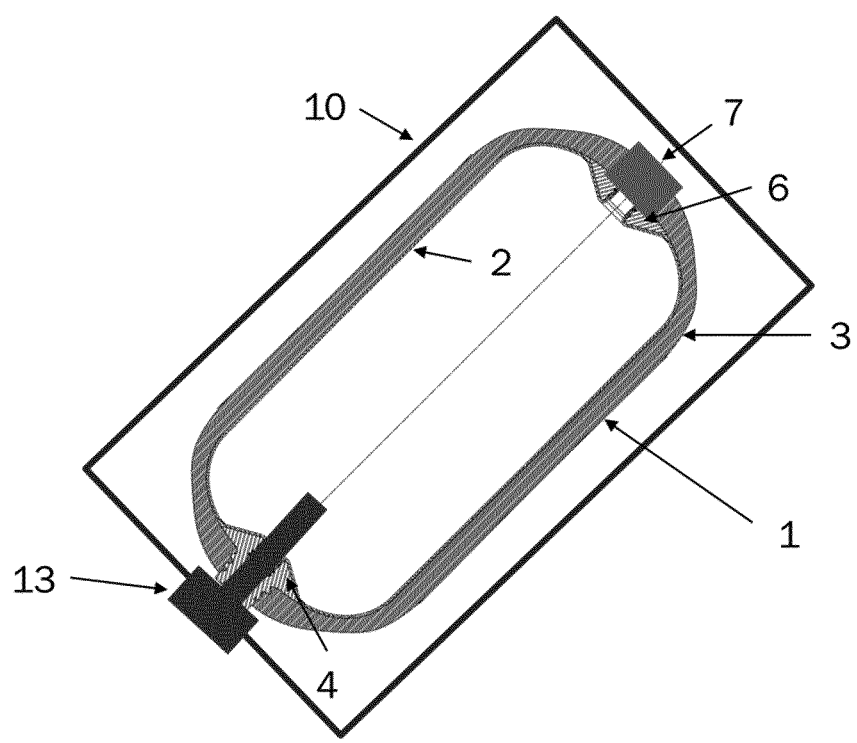

FIGS. 15 and 16 present steps of the manufacturing method of a composite pressure vessel (1) according to the invention. FIG. 15 shows that the first fixing means of the sleeve adaptor assembly or the third fixing means or the second fixing means used to fix the proof test adaptor to the composite pressure vessel is removed. The removal is performed in the first chamber (10) or in the second chamber. The first chamber is a second chamber if the testing and the manufacturing are not performed in the same chamber, preferably the first chamber is also the second chamber. FIG. 16 shows the step of fixing a valve assembly (13) on the composite pressure vessel. Said step is performed in the first chamber (10) or in the second chamber. The first chamber is a second chamber if the testing and the manufacturing are not performed in the same chamber, preferably the first chamber is also the second chamber.

FIG. 17 illustrates in details the step of measuring an external volume variation of the composite pressure vessel (1) and the location of said measurements using water as testing liquid.

FIGS. 18a and b illustrate a particular embodiment of a sleeve adaptor assembly (5) used in the methods of the manufacturing and testing composite pressure vessel (1) according to the invention. FIG. 18a) is a vertical section of sleeve adaptor assembly (5) illustrating the location of the suction line (51) and the pipe (53) for blowing a gas inside the composite vessel pressure on the first fixing means (50) for fixing the sleeve adaptor assembly to the first boss. FIG. 18b) illustrates the location of the different openings (54, 55, 56) for fluid communication on the first fixing means (50) for fixing the sleeve adaptor assembly to the first boss. A first opening is used for the suction of the liquid and the gas evacuation (54), a second opening is used for the liquid filing (55) and a third opening is used for the gas injection (56).

Figure 19:
FIG. 19 is a vertical cross is a vertical cross-section of a composite pressure vessel during a step of the method for performing pressure tests on a composite pressure vessel according to the invention.

FIG. 19: Example of OTV (On Tank Valve)) affixed on composite pressure vessels, said OTV being a FCV Cylinder valve.

The table I presents examples of composite pressure vessels on which the method for performing pressure tests according to the invention are performed.

TABLE 1

Examples of composite pressure vessels tested.

| Description | Unit | Composite pressure vessels | | | | | |
| --- | --- | --- | --- | --- | --- | --- | --- |
| | | 1 | 2 | 3 | 4 | 5 | 6 |
| Length (Boss to Boss) | mm | 870 | 1000 | 1050 | 1860 | 2010 | 2110 |
| Diameter after winding | mm | 360 | 430 | 320 | 360 | 450 | 415 |
| Volume | Liter | 52 | 81 | 60 | 150 | 240 | 180 |
| Amount openings | [-] | 1 | 2 | 2 | 2 | 2 | 2 |
| Boss Thread Nominal Rod Diameter) | Inch | 1"1/2 | 1"1/2 | 1"1/8 | 1"1/8 | 1"1/8 | 1"1/8 |
| Nominal working pressure | bar | 700 | 700 | 200 | 200 | 350 | 350 |

TABLE 1-continued

Examples of composite pressure vessels tested.

| Description | Unit | Composite pressure vessels | | | | | |
| --- | --- | --- | --- | --- | --- | --- | --- |
| | | 1 | 2 | 3 | 4 | 5 | 6 |
| Vessel Weight | Kg | +−40 | +−70 | +−20 | +−30 | −+90 | +−90 |
| Carbon fiber weight | Kg | +−21 | | | | | |
| Glass fiber weight | Kg | +−1 | | | | | |
| Epoxy resin weight | Kg | +−10 | | | | | |

The composite pressure vessels are type IV vessels for 350 bars or 700 bars nominal pressure applications. The liner of the composite pressure vessels is made of thermoplastic polymer(s), either mono- or multi-layer. The liners materials can be a polyolefin such as polyethylene (PE), preferably High Density Polyethylene (HDPE) and Polyamide (PA). The thickness of the liner is typically in the range of 2 to 7 mm. The liner is preferably submitted to a temperature in the range of −35° C. to +80° C. The boss is made of metal, generally of aluminum or steel, for example the boss is made of 6061-T6 hard anodized aluminum or 7075-T6 grade aluminum. The composite pressure vessel comprise an On Tank Valve (OTV). The OTV is assembled onto a composite pressure vessel opening. The composite pressure vessel is equipped with a Flow Control Valve (FCV) Cylinder Valve designed for use in high-pressure compressed hydrogen stationary or mobile storage cylinder. Module components fixed on the composite pressure vessel may comprises an outlet adaptor, a manual valve, a solenoid valve, a bleed valve, a Thermally activated Pressure Relief Device (TPRD, a Temperature-Sensor and an Excess Flow valve) (EFV).

An example of the process sequences is described in the table II.

TABLE II example of the process sequences:

| Process step | Manual/Automatic | Actions |
| --- | --- | --- |
| Load the composite pressure vessel into the machine | Manual | By pushing and sliding into loading position |
| Connect adaptor | TBD | |
| Close the first chamber | Automatic | |
| Pressurize with air to a few bar (<6 bar) | Automatic | |
| Fill the composite pressure vessel with test liquid to test pressure | Automatic | Air is compressed |
| Maintain test pressure per EC79 or R134 | Automatic | |
| Measure length and diameter expansion | Automatic | Calculate volumetric expansion |
| Release pressure | Automatic | Liquid is pushed out |
| Drain liquid from dead pocket | Automatic | Apply vacuum to plunger connection. Make sure to stay within acceptable vacuum level |
| Spray cleaning liquid through inlet Simultaneously vacuum dead pocket | Automatic | Spray nozzle to be defined Use warm liquid (50 to 70° C.) |
| Drain liquid from dead pocket | Automatic | Apply vacuum to plunger connection. Make sure to stay within acceptable vacuum level |
| Apply vacuum inside and outside the vessel | Automatic | Make sure to stay within acceptable vacuum level inside the vessel |
| Heat the chamber | Automatic | |

TABLE II-continued example of the process sequences:

| Process step | Manual/Automatic | Actions |
|---|---|---|
| Fill with $H_2/N_2$ test gas | Automatic | To a few bar |
| Repeat vacuum/filling cycles | Automatic | |
| Monitor the humidity | Automatic | Repeat the cycles until the humidity target is reached |
| Apply small pressure of $H_2/N_2$ inside | Automatic | |
| Remove the adaptor | Automatic | |
| Assembly the OTV | Automatic | Minimize open time to avoid air & humidity intake |
| Open the chamber | Automatic | |
| Disconnect the adaptor | | |

The table III presents several parameters used in the process

TABLE III example of process parameters:

| PROCESS STEPS | REQUIREMENT |
|---|---|
| Test gas | Test gas 5% $H_2$/95% $N_2$ |
| Pressurization liquid | Tap water |
| Initial vessel pressure | Atmospheric |
| Initial vessel content | Air |
| Air pressurization inside vessel before filling | 1 to 10 bar |
| Maximum Pressure increase rate during filling | 285 bar/s |
| Test pressure and test sequence | Per EC79 or R134 |
| Final pressure after emptying | Atmospheric |
| Drying cycles | Chamber pressure: from 100 mbar absolute to atmospheric Vessel pressure: from 100 mbar absolute to 10 bar |
| Humidity level after drying | −40 C. Dew Point |

The decompression will generate a temperature drop in the composite pressure vessel. Low temperature could lead to water condensation and freezing according to the pressure/temperature conditions during the decompression phase.

The humidity level is monitored to manage the dew point and avoid water freezing that could block or damage the installation during the decompression.

The invention claimed is:

1. A method for performing pressure tests on a composite pressure vessel, comprising:
   providing a composite pressure vessel comprising at least one opening for an injection of a liquid;
   injecting the liquid in the composite pressure vessel through the at least one opening to reach a threshold pressure;
   measuring an external volume variation of the composite pressure vessel
   draining the liquid from the composite pressure vessel through the at least one opening; and
   drying an inside cavity of the composite pressure vessel with a drying gas,
   wherein the drying the inside cavity of the composite pressure vessel is performed at a pressure inside the composite pressure vessel, which is lower than an external pressure.

2. The method according to claim 1, further comprising: heating the composite pressure vessel.

3. The method according to claim 2, wherein the heating the composite pressure vessel is performed during the drying the inside cavity of the composite pressure vessel.

4. The method according to claim 1, wherein the liquid is a liquid having a contact angle with a surface of the inside cavity of the composite pressure vessel higher than a contact angle of water with the surface of the inside cavity.

5. The method according to claim 1, wherein the liquid has a temperature of vaporization lower than a temperature of vaporization of water at an atmospheric pressure or at the pressure inside the composite pressure vessel.

6. The method according to claim 1, wherein the liquid is at least one selected from the group consisting of water, acetone, methanol, ethanol, isopropanol, butyl alcohol and a mixture of at least two thereof.

7. The method according to claim 1, wherein the drying gas is at least one selected from the group consisting of $N_2$, Ar, He, $H_2$ and a mixture of at least two thereof.

8. The method according to claim 1, wherein the drying gas is air.

9. The method according to claim 1, wherein the drying gas is heated.

10. The method according to claim 1, further comprising: manufacturing the composite pressure vessel.

11. The method according to claim 10, wherein the method further comprises fixing a valve on the composite pressure vessel after the drying the inside cavity of the composite pressure vessel with the drying gas.

12. A device which is configured for manufacturing and pressure testing a composite pressure vessel, comprising:
   a first chamber; and
   a second chamber,
   wherein the first chamber is configured to pressure test the composite pressure vessel and the second chamber is configured to dry the inside cavity of the composite pressure vessel.

13. The device according to claim 12, wherein the second chamber is further configured for fixing a valve assembly on an opening of the composite pressure vessel.

14. The device according to claim 12, wherein the first chamber is also the second chamber.

15. Pressure testing equipment for the composite pressure vessel of claim 1, comprising:
   a sleeve adaptor assembly comprising a suction point, a suction line and a first fixing means configured for fixing the sleeve adaptor assembly to a first boss of the composite pressure vessel;
   proof test adaptor assembly comprising a second fixing means for fixing the proof test adaptor assembly to the first boss and a first connecting means for connecting the composite pressure vessel to a liquid circuit; and
   a means for measuring composite pressure vessel deformation.

* * * * *